United States Patent [19]

Ruszkay et al.

[11] Patent Number: 5,976,600
[45] Date of Patent: Nov. 2, 1999

[54] MICROCRYSTALLINE CELLULOSE, A BULKING AGENT

[75] Inventors: Thomas A. Ruszkay, Mt. Laurel, N.J.; Donald Elliott, Aston, Pa.

[73] Assignee: FMC Corporation, Philadelphia, Pa.

[21] Appl. No.: 08/315,302

[22] Filed: Sep. 28, 1994

Related U.S. Application Data

[63] Continuation of application No. 07/949,301, Sep. 22, 1992, abandoned.

[51] Int. Cl.[6] .................................................. A23L 1/0534
[52] U.S. Cl. .......................... 426/518; 426/506; 426/518; 426/519; 426/573; 426/613; 426/633; 426/659; 426/804
[58] Field of Search ..................................... 426/573, 804, 426/658, 506, 518, 519, 633, 613, 659

[56] References Cited

U.S. PATENT DOCUMENTS

| | | | |
|---|---|---|---|
| 3,023,104 | 2/1962 | Battista | 426/549 |
| 4,734,287 | 3/1988 | Singer et al. | 426/41 |
| 4,814,195 | 3/1989 | Yokoyama et al. | 426/633 |
| 4,911,946 | 3/1990 | Singer et al. | 426/658 |
| 5,079,027 | 1/1992 | Wong et al. | 426/633 |

*Primary Examiner*—Helen Pratt
*Attorney, Agent, or Firm*—I. Robert Silverman; Polly E. Ramstad; Anthony L. Cupoli

[57] ABSTRACT

A pure, smooth microcrystalline cellulose bulking agent for oil containing foods such as nut butters, chocolates, cream containing foods, mayonnaise, and salad dressings. The bulking agent having a loose bulk density greater than 0.40 and a oil absorptivity of less than 1.0.

21 Claims, No Drawings

MICROCRYSTALLINE CELLULOSE, A BULKING AGENT

This application is a continuation, of application Ser. No. 07/949,301, filed Sep. 22, 1992, now abandoned.

FIELD OF THE INVENTION

The invention is in the field of non-caloric bulking agents for food systems. More particularly, the invention is in the field of microcrystalline cellulose bulking agents for low moisture content food systems.

BACKGROUND OF THE INVENTION

Fats and oils are recognized for their nutritional, functional and organoleptic properties. The food industry has been responding to consumer demand by offering an increasing variety of low-fat foods that offer the quality and taste of full-fat systems. The development of consumer acceptable low-fat food has been the result of new, as well as exciting, food ingredients created to replace some or all of the fat, without sacrificing the taste or texture consumers desire. Organoleptic properties are critical.

Fatty or oily mouth feel can be described as a combination of several basic parameters which together form the recognizable edible sensation of fattiness or oiliness. These parameters are viscosity (thickness, body, fullness), lubricity (creaminess, smoothness), absorption/adsorption (physiological effect on taste buds), and others (which may include such factors as cohesiveness, waxiness and mouthcoating).

Certain forms of cellulose have been used as a bulking agent which can be substituted for fat. One of those forms, microcrystalline cellulose (MCC) is a partially purified depolymerized form of cellulose and is obtained by treating pulps derived from fibrous plant material with mineral acid. The acid preferentially attacks the less ordered or amorphous regions of the cellulose polymer chain, thereby exposing and freeing the crystalline sites which form cellulose crystallite aggregates. The reaction mixture is washed to remove the degraded byproducts, the resulting wet-cake freed of water and the dried cellulose crystallite aggregates, or more commonly microcrystalline cellulose, recovered.

Microcrystalline cellulose is a white, odorless, tasteless, relatively free-flowing powder, insoluble in water, organic solvents, dilute alkalies and dilute acids. Small particles sized less than about 30 microns have been used in products which have been used in foods as bulking agents and as fat substitutes.

U.S. Pat. No. 4,911,946 teaches the use of a carbohydrate having a substantially spheroidal shape and a mean diameter particle size distribution between about 0.1 and about 2 microns with less than about 2% of the number of particles exceeding 3 microns as an additive for fat/cream-containing food products to replace all or a portion of the fat/cream-containing food products normally present in the food.

U.S. Pat. No. 4,814,195 teaches that particle size, oil binding capacity, and density of a bulking agent together with its taste determine its task specific suitability. According to this reference, generally, the particle size should fall within the range of 5 to 35 microns, with no measureable particles exceeding 35 microns. The oil binding capacity should fall within the range of 20 to about 45%, and the density should fall within the range of 1.3 to about 1.6 grams per cubic centimeter.

According to the '195 patent, commercially available cellulose, alpha-cellulose, micro-fibrillated cellulose, natural fibers, and Avicel® microcrystalline cellulose have large porous surface areas; thus they absorb excessive amounts of oil and are not suitable for use in the reduced calorie peanut butter products of the present invention.

That patent further teaches that one way to minimize the oil-binding capacity of commercially available microcrystalline cellulose is to agglomerate the submicron constituent particles to form smooth-surfaced aggregates having a substantially increased effective particle size and effectively decreased oil-binding capacity. There is no teaching that these particles be spherical or that this can be done with non-submicron particles.

A method of producing spherical particulates that is attracting the increased attention of the pharmaceutical industry is that of spheronization. The essential features of this technique typically involves the steps of: forming a dry blend of powdered components; wetting the dry blend with a liquid, usually aqueous, in the presence of a binding agent to give a plastic-like mass or granulation; extruding the mass through a screen or die to form a spaghetti extrudate; cutting the extrudate in short cylinders followed by a rounding stage in which the cylinders are rolled on a grooved surface into spheres. For more detailed information on the process reference is made to "A new Technique for the Production of Spherical Particles" by A. D. Reynolds in Manufacturing Chemist & Aerosol News, Jun. 1970.

SUMMARY OF THE INVENTION

We have discovered a new form of microcrystalline cellulose, and a method for making it. We call this new form "pure spheronized attrited microcrystalline cellulose." The pure spheronized attrited microcrystalline cellulose of this invention is particularly suited for use as a bulking agent in oil based foods or food components, which include nut butters, chocolates, ice creams, mayonnaise, lards, and fillings.

Pure spheronized attrited microcrystalline cellulose can be produced by spray drying mechanically particle size reduced hydrolyzed cellulose. The product that is formed has not heretofore been produced. The product is unique in that particles are formed which are substantially smooth, having a high absolute density, a high loose bulk density, a low degree of oil absorptivity, and a substantially spherical shape, as seen at 150 times magnification.

The spheronized attrited microcrystalline cellulose is termed "pure" because it is in substantially pure cellulose and can be considered a one component system.

As a result of the reduced surface area to volume ratio of this product afforded by the spherical shape, and the high absolute density of the particle, the liquid (both oil and or water) binding capacity of this product is significantly reduced compared to other cellulose based products.

The absolute density of the particles is quite high, and generally exceeds 1.20 grams per cubic centimeter. A preferred density exceeds 1.35 grams per cubic centimeter, and the most preferred product has a density exceeding 1.50 grams per cubic centimeter. The density can be varied by moderating the formation of the wet stage intermediate, by using an intermediate of varying degrees of particle size reduction. The larger the particles being used in the intermediate stage are, the less likely they are to form the strong bonding between adjacent particles which produces the high density product.

The high density and reduced absorptivity of the particles is fostered by the formation of the attrited microcrystalline cellulose intermediate as a wet stage process from which the final aggregate is formed.

This type of product has not been attained in the prior art. The prior art products, in fact, are characterized by a loose bulk density which markedly decrease with a decrease in particle size. The products of this invention evidence a loose bulk density that is dependent primarily on the production parameters and not on the final particle size. For the product of this invention the loose bulk density is almost a constant for a wide range of final product particle sizes.

The loose bulk density normally is greater than about 0.40 grams/cc. Preferably, the loose bulk density is greater than about 0.45 grams/cc. Most preferably, the loose bulk density lies within the range of 0.50 to 0.65 grams/cc with a mean particle size within the range of from 5 microns to 35 microns. In the prior art, because of packing volumes, the loose bulk density will generally increase with decreased particle size. The products of this invention tend to have a loose bulk density which is relatively independent of particle size.

The pure, spheronized attrited microcrystalline cellulose is prepared by attriting microcrystalline cellulose which is subsequently spray dried to form the pure attrited microcrystalline cellulose. This spray dried product is different from the products previously used or discussed in that it is substantially spherical. In addition, it is of high density, it has an extremely smooth, hard surface, and it has a substantially reduced liquid adsorptivity. In one embodiment, the pure spheronized attrited microcrystalline cellulose is prepared by forming a cellulose slurry, attriting the cellulose in the slurry, and then spray drying the attrited cellulose.

The attrited microcrystalline cellulose in the slurry generally has a final mean particle size within the range of from 5 to 15 microns. It is preferred that the mean particle size of the microcrystalline cellulose in the slurry be less than the mean particle size of the pure spheronized microcrystalline aggregate.

A final product having a final mean particle size within the range of from 5 to 50 microns can be produced, although, in practice, the particles may be made smaller or larger because the desired particle size is controlled to a large extent by the end use application requirements. The preferred particle sizes for use as a bulking agent in oil based systems generally range from 5 to 45 microns. The more preferred particles sizes for those oil based applications are generally within the range of from 10 to 35 microns; while, the most preferred particle sizes are within the range of 10 to 30 microns.

DESCRIPTION OF THE PREFERRED EMBODIMENTS

Other than in the operating examples, or where otherwise indicated, all number expressing quantities of ingredients, parameters, or reaction conditions used herein are to be understood as modified in all instances by the term "about."

Presented below are examples of the preparation and spray drying of a mechanically particle size reduced microcrystalline cellulose to a high bulk density, very stable, spherical form having significantly reduced liquid absorptivity.

Definitions and Tests

The following definitions and tests will facilitate an understanding of the Examples provided herein.

Loose Bulk Density

Loose bulk density is a measure of the density of dry, attrited microcrystalline cellulose product. The loose bulk density is measured by pouring dry product into a container, which is then weighed. The loose bulk density is the weight of the microcrystalline cellulose divided by the volume of the microcrystalline cellulose; it is a function of the density of the particles, and of the packing ability of the powder.

Modified ASTM B329-81 procedure was used for the loose bulk density determinations. The ASTM procedure was modified by replacing the 16 mesh screen of the top brass funnel with a 10 mesh screen.

In practice, samples are placed in a 25 ml container and weighed. The ratio of weight in grams per cc is the loose bulk density of the sample.

Absolute Particle Density

Absolute particle density is determined by filling a 25 ml container with dry sample and weighing the sample; then adding liquid to the sample in the container until the container is filled to overflowing, and then weighing the wet sample. The particle density is the weight in grams of the dry 25 ml sample divided by the volume occupied by the particles, where the volume taken up by the particles is the volume of the container minus the volume of the liquid at 25° C. The volume of the liquid is determined from its weight at 25° C. by subtracting the weight of the dry sample from the weight of the sample to which the liquid has been added.

The term "dry sample" indicates that the sample is substantially free from oil and water.

The term "wet sample" indicates that the sample has oil or water.

Particle Shape

The shape of the particles was determined by photographing them at 150 times magnification. At 150 times magnification, the particles of this invention appear spherical to one of ordinary skill in the art.

Absorptivity Test

Absorptivity for oil, water, or oil and water is determined by the following procedure. Three (3) grams of dry sample are mixed with 27 grams of liquid. The mixture is placed in a test tube and centrifuged at 11,000 rpm for 16 minutes. The excess liquid is poured off and the wet sample is weighed. The absorptivity in grams of liquid per grams of dry sample is determined by the following formula:

$$\text{Absorptivity} = \frac{\text{Wet Weight} - \text{Dry Weight}}{\text{Dry Weight}}$$

Particle size is defined to be mean particle size as measured on a Horiba model L-500 laser diffraction particle size analyzer.

The efficacy, of the pure, spherical microcrystalline cellulose of this invention in food products is determined using a series of tests. These tests are described below.

Grittiness/Taste Test

A sample of the food is eaten and evaluated for grittiness and taste in the process.

Spreadability Test

A sample of product is evaluated for spreadability by spreading it on a smooth surface with a blade.

EXAMPLE 1

Hydrolyzed microcrystalline cellulose (MCC) wet cake derived from fibrous cellulose wood pulp (solids content 39.5%) has a mean particle size of 20 microns as measured by a Horiba model L-500 laser diffraction particle size analyzer. The MCC was mechanically particle size reduced (attrited) to a mean value of 8–10 microns, as quantified by the Horiba, by passing it through a high solids mixer. Attrited MCC (43% solids) was combined with deionized water to produce a 12% solids MCC slurry. The slurry was passed thru a colloid mill to pre-disperse the attrited MCC in the water. This slurry was then homogenized to fully disperse the MCC. The viscosity of the dispersed slurry was 11,000 cps as measured on a Brookfield viscometer with a #5 spindle operating at 20 rpm for 1 minute.

This attrited MCC slurry was spray dried on an 8' Bowen spray dryer using a 6 inch diameter curved vane atomizing disk operating at 17,500 rpm with a slurry feed rate of 1 gal/min. The inlet dryer temperature was 430° F. and the outlet temperature was 190° F. The final product was spherical in form and had a final moisture content of 2.8%. The sieve fraction of the product was 19%+400 mesh (37 microns) and the Horiba mean particle size analysis was 28 microns. The loose bulk density of the sample was 0.60 gms/cc.

EXAMPLE 2–6

Numerous spray drying experiments were conducted varying the atomizing disk rpm to produce different size spherical particles. The following is a summary of the atomization conditions evaluated and the resulting particle size data.

| Sample_# microns) | Disk_RPM | SF_%_+_400 | Horiba_PS | gms/cc |
|---|---|---|---|---|
| 2 | 19,450 | 12 | 24 | .57 |
| 3 | 16,400 | 23 | 28 | .60 |
| 4 | 14,000 | 32 | 31 | .63 |
| 5 | 14,600 | 36 | 37 | .63 |
| 6 | 12,750 | 42 | 42 | .65 |

EXAMPLE 7

Hydrolyzed microcrystalline cellulose (MCC) wet cake derived from fibrous cellulose wood pulp (solids content 39.5%) having a mean particle size of 20 microns as measured by a Horiba model number L-500 laser diffraction particle size analyzer was used. The MCC wet cake (40% solids) was combined with deionized water to produce an 8.6% solids MCC slurry. The MCC wet cake was dispersed in the water using a mixer. The MCC was mechanically particle size reduced (attrited) to a mean value of 10 microns as quantified by the Horiba by passing the slurry through a homogenizer. The viscosity of the slurry was increased from 400 cps to 5600 cps as a result of the particle size reduction (attrition) which occurred during the homogenization process. The viscosity was measured on a Brookfield viscometer with a #5 spindle operating at 20 rpm for 1 minute.

The attrited MCC slurry was spray dried on an 8 foot bowen spray dryer using a 6 inch diameter curved vane atomizing disk operating at 18,250 rpm with a slurry feedrate of 1 gal/min. The inlet dryer temperature was 375° F. and the outlet temperature was 190° F. The final product was spherical in form and had a final moisture content of 3.6%. The sieve fraction of the product was 18%+400 mesh (37 microns) and the Horiba mean particle size analysis was 24 microns. The bulk density of the sample was 0.48 gms/cc.

The above run was conducted using homogenization to produce a MCC particle with a Horiba mean particle size of 12 microns. The slurry solids during homogenization was 9.7% During homogenization the viscosity was increased from 700 cps to 4000 cps. The slurry was spray dried @ 21,000 RPM atomization with an inlet temperature of 365° F. and an outlet temperature of 190° F. The final product was mostly spherical in form and had a moisture content of 3.6%. The sieve fraction of the product was 24%+400 mesh and the Horiba mean particle size was 24 microns. The bulk density of the sample was 0.48 gms/cc.

EXAMPLE 8

Nut butters having the usual primary components are prepared containing from 4 to 25 percent by weight of the substantially spherical microcrystalline cellulose of this invention, plus other fillers. Those usual components are nuts, sugar, salt and hydrogenated vegetable oil. Other nut butter additives known to those of ordinary skill in the art could also be used.

It is discovered that the functionality of the nut butters are as follows:

| % MCC | Qualities |
|---|---|
| 4 | Non-gritty, spreadable, good taste |
| 10 | Non-gritty, spreadable, good taste |
| 15 | Non-gritty, spreadable, good taste |
| 20 | Non-gritty, spreadable, good taste |
| 25 | Non-gritty, spreadable, good taste |

EXAMPLES 9–13

The following examples selected specific physical properties of different forms of microcrystalline cellose for comparison.

Example 9 is a commercially available microcrystalline cellulose which was hydrolyzed, but spray dried without prior attrition.

Example 10 is a the commercially available microcrystalline cellulose of Example 9 which was further particle size reduced.

Examples 11–13 are embodiments of this invention, prepared as described in Example 1.

The data is provided in tabular form below.

TABLE

| | Physical Property | | | | |
|---|---|---|---|---|---|
| | Example 9 | Example 10 | Example 11 | Example 12 | Example 13 |
| % Moisture | 3.0 | 4.1 | 3.6 | 3.0 | 4.1 |
| Horiba Mean PS (microns) | 32 | 14 | 28 | 24 | 28 |
| PS % > 35 microns Horiba | 46 | 6 | 37 | 22 | 34 |
| PS % > 51 microns | 21.4 | 1.5 | 16.1 | 6.0 | 11.5 |
| Sieve Fraction | 58 | 0.2 | 21 | 5 | 24 |

TABLE-continued

| Physical Property | Example 9 | Example 10 | Example 11 | Example 12 | Example 13 |
|---|---|---|---|---|---|
| % +400 mesh (37 microns) | | | | | |
| Loose Bulk Density (gms/cc) | .42 | .30 | .56 | .53 | .53 |
| Absolute Density (gms/cc) | 1.34 | .92 | 1.64 | 1.36 | 1.55 |
| Oil Absorptivity (gms/gm MCC) | 1.25 | 1.16 | .80 | .83 | .93 |
| Water Absorptivity (gms/gm MCC) | 1.49 | 1.76 | 1.37 | 1.53 | 1.47 |
| Organoleptic Functionality | Gritty PS too large | Spreadablity poor, oil absorptivity too large | Acceptable products, non-gritty, very spreadable, commercially viable, low cost process | Same as previous column | Same as previous column |

The table above, depicting Example 9–13 shows the differences between the new product of this invention and other microcrystalline cellulose products. The product of this invention has a relatively constant absolute bulk density over a range of particle sizes. That absolute density is higher than any product previously produced. Moreover, the loose bulk density is virtually a constant for the products of this invention, with the loose bulk density falling within the range of 0.50 to 0.60.

A comparison of the particle sizes and oil absorptivity shows that for any given particle size the product of this invention has a lower oil absorptivity.

These properties give the product of this invention a less gritty feeling and a smoother, more spreadable character than that afforded by other microcrystalline cellulose products.

EXAMPLES 14–16

The pure, spheronized microcrystalline cellulose of this invention is substituted for lard as follows:

EXAMPLE 14

4 weight percent MCC.
The feel is smooth.

EXAMPLE 15

10 weight percent MCC
The feel is smooth

EXAMPLE 16

20 weight percent MCC
The feel is smooth

The above Examples demonstrate that the smooth, spherical microcrystalline cellulose of this invention is well suited for use as a bulking agent in foods, particularly in foods containing oils.

We claim:

1. A composition comprising a microcrystalline cellulose particle having a substantially spherical shape as seen at 150 times magnification, having a loose bulk density greater than 0.4 grams per cubic centimeter and having an oil absorptivity of less than one.

2. The microcrystalline cellulose of claim 1, wherein the loose bulk density is greater than 0.5 grams per cubic centimeter.

3. The composition of claim 2, wherein the microcrystalline cellulose has a mean particle size within the range of 5 to 35 microns, and a loose bulk density within the range of 0.50 to 0.65 grams per cubic centimeter.

4. The composition of claim 2, wherein the microcrystalline cellulose has a mean particle size within the range of 20–30 microns.

5. A process for making a cellulose, comprising the steps of:
   A). forming an aqueous microcrystalline cellulose slurry,
   B). attriting the microcrystalline cellulose to an attrited microcrystalline cellulose intermediate having a mean particle size of less than 15 microns, and
   C). spray drying the attrited microcrystalline cellulose intermediate to produce a substantially spherical, microcrystalline cellulose aggregate having a mean particle size of less than about 50 microns.

6. The process of claim 5 wherein the attrited cellulose intermediate produced in step B has a mean particle size of less than about 15 microns.

7. The process of claim 5 wherein:
   the attrited cellulose aggregate produced in step C has a mean particle size that falls within the range of from 20 to 35 microns, and
   the attrited cellulose intermediate produced in step B has a mean particle size of less than about 15 microns, and is generally smaller than the cellulose aggregate.

8. The product made according to the process of claim 5.

9. A reduced calorie nut butter product containing ground non-defatted nut butter and from about 0.1 to about 40 percent by weight of a smooth, spherical microcrystalline cellulose aggregate bulking agent having an oil absorptivity of less than 1.0, and a loose bulk density within the range of 0.5 to 0.65 microns.

10. A reduced calorie cream filling containing a hydrogenated vegetable oil and at least 1 percent by weight of a pure, smooth, spherical microcrystalline cellulose aggregate bulking agent having an oil absorptivity of less than 1.0, a mean particle size of 35 microns or less, and a loose bulk density greater than 0.40.

11. The cream filling of claim 10 wherein the pure, smooth, spherical microcrystalline cellulose aggregate bulking agent has an oil absorptivity of less than 0.88.

12. A reduced calorie food product containing a smooth, spherical microcrystalline cellulose aggregate bulking agent having an oil absorptivity of less than about 1.0, a mean particle size of 35 microns or less, and a loose bulk density greater than 0.40 grams per cubic centimeter.

13. The reduced calorie food of claim 12, wherein the pure, smooth, spherical microcrystalline cellulose aggregate bulking agent has an oil absorptivity of less than 0.88.

14. The reduced calorie dry food of claim 12 wherein the smooth, spherical microcrystalline cellulose aggregate bulking agent has an oil absorptivity of less than about 0.83.

15. The reduced calorie food product of claim 12 wherein the food is chocolate.

16. The reduced calorie dry food of claim 12 wherein the food is peanut butter.

17. The reduced calorie dry food of claim 12 wherein the food is a baked good product.

18. The reduced calorie dry food of claim 12 wherein the food contains a cream filling.

19. A process for making a microcrystalline cellulose, comprising the steps of

A) attriting microcrystalline cellulose to an attrited microcrystalline cellulose intermediate having a mean particle size of less than 15 microns, B) forming an aqueous microcrystalline cellulose slurry by mixing the attrited microcrystalline cellulose intermediate with water, and C) spray drying the attrited microcrystalline cellulose intermediate to form a microcrystalline cellulose aggregate having a mean particle size of less than about 50 microns, wherein the aggregate is comprised of particles having a substantially spherical shape as seen at 150 times magnification, having a loose bulk density greater than 0.4 grams per cubic centimeter and having an oil absorptivity of less than one.

20. The process of claim 19 wherein the aggregate has a mean particle size of less than about 35 microns and has a bulk density greater than 0.40 gm/cc.

21. The product made according to the process of claim 20.

* * * * *